July 27, 1965     S. J. ESTRABAUD     3,196,681

APPARATUS FOR MEASURING THE FLOW OF A GAS

Filed Nov. 23, 1962

United States Patent Office 3,196,681
Patented July 27, 1965

3,196,681
APPARATUS FOR MEASURING THE FLOW
OF A GAS
Stéphane J. Estrabaud, Antony, France, assignor to
Rochar Electronique, Montrouge, Seine, France, a corporation of France
Filed Nov. 23, 1962, Ser. No. 239,493
Claims priority, application France, Dec. 9, 1961,
881,527, Patent 1,315,810
3 Claims. (Cl. 73—231)

The present invention has for its object an apparatus for measuring the flow of a gas, when said flow varies, within wide limits and has low minimum values.

In certain cases it is required to measure a gaseous flow which is liable to vary suddenly and within wide limits. The expansion of the gas may then cause the condensation thereof to occur at the level of the flowmeter sensing unit. Such condensation being liable to put the flow sensing unit out of order and provide erroneous measurement results. Besides, the temperature and pressure of the gas are rather badly defined, so that it becomes difficult to determine the density thereof and infer the mass flow therefrom. It is an object of the present invention to provide a flowmeter which is adapted to solve these problems and comprises means for eliminating the harmful effects of condensation. According to an aspect of the invention, said means essentially consists in two valves which delimit a duct portion wherein the flow sensing units are placed, said valves being formed with openings enabling the passage of the gas in said dust portion, said two valves being arranged in such a manner that one or the other thereof remains open, according to the direction of the gas flow.

The invention will be best understood from the following description and appended drawings, wherein.

Figure 1:
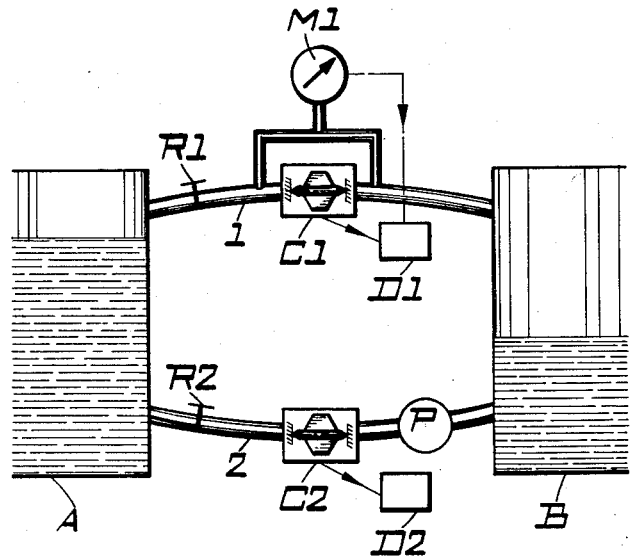
FIGURE 1 is a simplified diagram of a supply unit of a liquefied gas incorporating the device according to the invention.

In FIGURE 1 there is shown, very diagrammatically, the tank A of a liquefied gas delivery truck, for instance of liquid carbon dioxide, connected, through two pipes 1 and 2, with the tank B to be filled up, said two pipes being closed by means of two cocks, $R_1$ and $R_2$, respectively. The supply occurs in two stages: in the first stage, with cock $R_2$ closed and cock $R_1$ opened, the gas pressures inside the two tanks are equalized (expansion stage); in a second stage, during which both cocks are open, a certain amount of liquid is transferred from A to B through a pump P. The pumping operation is obviously facilitated by this preliminary expansion.

Flow sensing units $C_1$ and $C_2$ are inserted into pipes 1 and 2, in combination with means for accurately determining the total net mass flow of the product transferred from A to B during the whole of the operation, whether in the gaseous, or in the liquid state.

Figure 2:
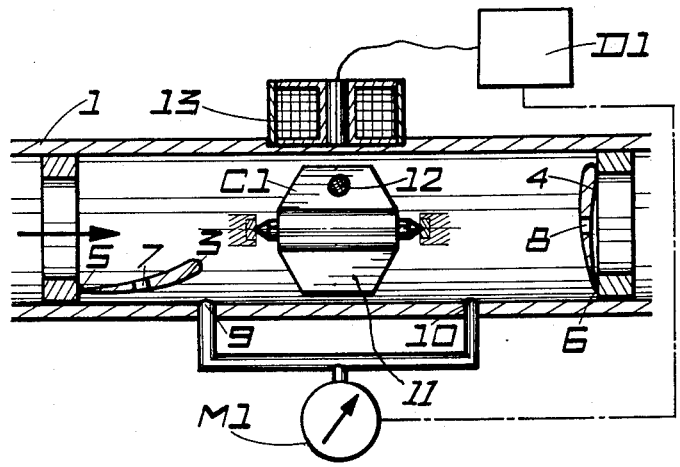
FIGURE 2 is a detail of the portion of the gas transfer duct, enclosing the flow sensing unit.

During the expansion stage, the measurement of the gaseous mass transferred from one tank to the other, in a direction which in principle is not known, is effected, according to a preferred embodiment if the invention, by means of a flow sensing unit $C_1$, preferably of the known turbine rotor type, associated with a suitable pulse counting device and with a pressure-gauge $M_1$. As known, this type of sensing unit which is shown more in detail in FIG. 2 comprises a turbine rotor (11, FIG. 2) adapted to be rotated by the fluid, a small magnet (12, FIG. 2) fitted on the turbine and a coil (13, FIG. 2) wherein said magnet induces electric pulses of a frequency proportional to the volumetric flow to be measured. This frequency is determined by a counter unit $D_1$.

To obtain the mass flow, it is necessary to determine the density of the gas. This density is low and varies in substantial proportions, according to the temperature and pressure prevailing in the tanks. In the case of the carbon dioxide, a pressure measurement will be carried out by means of pressure-gauge $M_1$. Since the vapour present is saturated, the density is in fact connected with the pressure by an approximately linear relation; under these conditions, the density will be easily calculated when the pressure is known and an accurate determination of the mass flow is then achieved. In the case of certain other gases, it may be preferred, in order to find the density, to effect a temperature measurement.

In the figure, the dotted line indicates that the value of the pressure is transmitted to counter $D_1$ and used by it to determine the mass flow.

The practical embodiment of counter $D_1$, comprising for instance an electronic frequency-meter and an analog computer, which takes into account the density for determining the mass flow, is within reach of the skilled man and will not be described here.

The turbine-type sensing unit should be capable of determining the direction of the gas transfer: to this end, it will advantageously comprises a second coil, the axis of which is parallel to the usual coil; the current collected across said second coil will be phase-shifted by an angle of 90° with respect to the current collected across the first coil, and the signal of this phase-shift, determined by means of a phasemeter, will indicate the direction of flow of the fluid.

The assembly just described enables to determine the gaseous mass transfer during the expansion stage with a sufficient accuracy, provided the harmful effects of the condensations on the measurement are eliminated. This result is obtained due to an important features of the invention, which will now be described with reference to FIGURE 2.

This feature consists in locating the turbine-type flowmeter counter $C_1$ (symbolized in FIG. 1 simply by the turbine blades) in a portion of pipe 1 delimited by two valves 3, 4, pivoted in 5, 6, and provided with openings 7, 8.

When the gas is flowing, for instance in the direction of the arrow, valve 3 is open and valve 4 closed, so that the expansion is achieved only through opening 8. In the opposite sense of the flow of the gases, the expansion will occur only through opening 7. Under these conditions, no condensation may practically occur at the level of the flow sensing unit: thus, the danger of its getting out of order is entirely eliminated, and, besides, a well determined pressure and temperature is obtained at the level of the corresponding measuring device. In the example described, this measuring device is a pressure-gauge $M_1$, fitted with two pressure intakes 9 and 10, placed on both sides of the turbine. The pressure is perfectly defined at the level of these intakes, which substantially provide the overage pressure in the duct portion which contains the turbine.

During the pumping stage, the measurement of the flow of the pumped liquid, in which no delicate problem arises, will be preferably effected by means of a second turbine-type flow sensing unit $C_2$, combined with a counter and computer device $D_2$.

This latter device, the embodiment of which is within reach of the skilled man, calculates the mass flow, account taken of the liquid density.

Preferably, the density is determined by measuring the temperature of the liquid, for instance by means of a resistance probe (not illustrated).

During the pumping stage, it is also desirable to determine the flow of the gas transferred from tank B to tank A (said gas is pushed out of tank B by the liquid penetrating into the latter).

This determination will be preferably effected, in the case of the carbon dioxide, by measuring said flow by means of the assembly ($C_1$, $D_1$) already described.

In other applications, it may be desirable to introduce into the computer part of device $D_2$ a correcting term, taking account of the transferred gas flow. The volume of the gas transferred is already known, since it is equal to the volume of the liquid transferred during the same stage.

It is to be understood that many other applications of the apparatus described may be considered and that various modifications and variations may be carried out by those skilled in the art, without departing from the spirit and scope of the invention, as defined in the appended claims.

What I claim is:

1. An apparatus for measuring the flow of a gas in a pipe, of the type comprising a turbine rotor arranged in said pipe, said turbine rotor being adapted to be rotated at a velocity proportional to the volumetric flow of the gas, at least one magnet secured to said turbine rotor, at least one winding coupled to said magnet and electronic counting means connected across said winding for receiving recurrent pulses therefrom, said apparatus further comprising a duct portion forming part of said pipe, first and second valve seats in said duct portion, first and second swing valve members respectively pivoted at one point of said first and second seats, the flow of the gas in one direction keeping one of the valve members completely open and completely closing the other valve member, while reversal of the flow closes the open valve member and opens the closed valve member at the respective ends thereof; a discharge opening in each of said valve members; said turbine rotor and said magnet being arranged within said duct portion.

2. An apparatus for measuring the flow of a gas in a pipe, of the type comprising a turbine rotor arranged in said pipe, said turbine rotor being adapted to be rotated at a velocity proportional to the volumetric flow of the gas, at least one magnet secured to said turbine rotor, at least one winding coupled to said magnet and electronic counting means connected across said winding for receiving recurrent pulses therefrom, said apparatus further comprising a duct portion forming part of said pipe, first and second valve seats in said duct portion, first and second swing valve members respectively pivoted at one point of said first and second seats, the flow of the gas in one direction keeping one of the valve members completely open and completely closing the other valve member, while reversal of the flow closes the open valve member and opens the closed valve member at the respective ends thereof; a discharge opening in each of said valves; said turbine rotor and said magnet being arranged within said duct portions, said apparatus further comprising means for measuring the pressure of the gas inside said duct portion, said electronic counting means including means connected to said pressure measuring means, for calculating the mass flow of said gas from said pressure and from the frequency of said pulses.

3. Apparatus for measuring the flow of a gas in a pipe, of the type comprising a turbine rotor arranged in said pipe, said turbine rotor being adapted to be rotated at a velocity proportional to the volumetric flow of the gas, at least one magnet secured to said turbine rotor, at least one winding coupled to said magnet and electronic counting means connected across said winding for receiving recurrent pulses therefrom, said apparatus further comprising a duct portion forming part of said pipe, first and second valve seats in said duct portion, first and second swing valve members respectively pivoted at one point of said first and second seats, the flow of the gas in one direction keeping one of the valve members completely open and completely closing the other valve member while reversal of flow closes the open valve member and opens the closed valve member at the respective ends thereof; a discharge opening in each of said valve; said turbine rotor and said magnet being arranged within said duct portion, said apparatus further comprising means for measuring the average gas pressure in two points of said duct portion which are respectively located upstream and downstream with respect to said turbine rotor, said electronic counting means including means connected to said pressure measuring means, for calculating the mass flow of said gas from said pressure and from the frequency of said pulses.

References Cited by the Examiner

UNITED STATES PATENTS

| | | | |
|---|---|---|---|
| 2,709,755 | 5/55 | Potter | 73—231 X |
| 2,747,403 | 5/56 | Stevenson | 73—230 X |
| 2,901,173 | 8/59 | Clicques | 73—194 X |
| 3,000,210 | 9/61 | Faure-Herman | 73—231 |
| 3,021,684 | 2/62 | Berck | 73—199 X |
| 3,076,337 | 2/63 | Gehre | 73—199 |

FOREIGN PATENTS 758,094 9/56 Great Britain.

RICHARD C. QUEISSER, *Primary Examiner*.